United States Patent
Tsai et al.

(10) Patent No.: US 9,100,949 B2
(45) Date of Patent: *Aug. 4, 2015

(54) INTERLACING WIRELESS COMMUNICATION FRAMES

(71) Applicant: Telefonaktiebolaget L M Ericsson (publ), Stockholm (SE)

(72) Inventors: Shiau-He Shawn Tsai, San Diego, CA (US); Per Ernstrom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,979

(22) Filed: Jul. 2, 2013

(65) Prior Publication Data

US 2013/0294411 A1 Nov. 7, 2013

Related U.S. Application Data

(63) Continuation of application No. 12/268,692, filed on Nov. 11, 2008, now Pat. No. 8,477,697.

(60) Provisional application No. 60/992,849, filed on Dec. 6, 2007.

(51) Int. Cl.
*H04W 72/04* (2009.01)
*H04B 7/26* (2006.01)

(52) U.S. Cl.
CPC ............. *H04W 72/04* (2013.01); *H04B 7/2656* (2013.01); *H04W 72/048* (2013.01)

(58) Field of Classification Search
CPC .......................... H04L 27/2602; H04L 5/0048
USPC ........................................................ 370/331
See application file for complete search history.

(56) References Cited

U.S. PATENT DOCUMENTS

2008/0107047 A1* 5/2008 Olfat .............................. 370/280
2008/0285473 A1* 11/2008 Chen et al. ..................... 370/252

(Continued)

FOREIGN PATENT DOCUMENTS

EP           2 019 528 A2    1/2009
WO      2008/049028 A1    4/2008

(Continued)

OTHER PUBLICATIONS

Roger Marks et al., "802.16m Frame Structure to Enable Legacy Support, Technology Evolution, and Reduced Latency", IEEE 802.16 Broadband Wireless Access Working Group, IEEE C802.16m-07/263, Nov. 7, 2007, (7 pages).

(Continued)

*Primary Examiner* — Fan Ng
*Assistant Examiner* — Aung Oo
(74) *Attorney, Agent, or Firm* — Baker Botts, LLP

(57) ABSTRACT

Mechanisms to interlace multiple legacy frames to enhance radio resource utilization are described. Also described are mechanisms to modify a low-latency frame structure to appear as legacy frames. In one aspect, partially blanked-out legacy frames are interlaced with time offsets so that they complement each other to leave no idle system time. To a legacy user equipment, the interlaced frame appears as normal legacy frames used by multiple legacy cells. In another aspect, the low-latency frame is modified to appear as an interlaced frame. Again to the legacy user equipment, the low-latency frame appears as legacy frames from multiple legacy cells. To the low-latency user equipment, the modified low-latency frame still appear as normal low-latency frame. In this manner, radio resources of the legacy base stations are optimally utilized. Also, low-latency base stations are enabled to provide serves to the legacy user equipments without wasting radio resources.

18 Claims, 14 Drawing Sheets

(56) References Cited

U.S. PATENT DOCUMENTS

2009/0016371 A1* 1/2009 Zheng et al. .......... 370/431
2009/0067377 A1* 3/2009 Talukdar et al. .......... 370/329
2009/0147742 A1 6/2009 Tsai et al.

FOREIGN PATENT DOCUMENTS

WO 2008/094015 A1 8/2008
WO 2008/111807 A2 9/2008

OTHER PUBLICATIONS

Zexian Li et al., "TDD frame structure for 802.16m", IEEE 802.16 Broadband Wireless Access Working Group, IEEE C802.16m-07/215, Nov. 7, 2007, (4 pages).

Kiran Thakare et al., "An Evolved Frame Structure for IEEE 802.16m", IEEE 802.16 Broadband Wireless Access Working Group, IEEE C802.16m-07_235, Nov. 7, 2007, (5 pages).

International Search Report dated May 13, 2009 (5 pages).

IEEE C802.16m-08/095r1, "An Evolved Frame Structure and the use of fractional OFDMA symbols", IEEE 802.16 Broadband Wireless Access Working Group, Nov. 7, 2007

Australian Office Action dated Nov. 23, 2012 in Australian Patent Application No. 2008331979 (3 pages total).

Chinese Notice of Allowance with English translation dated Dec. 5, 2012 in Chinese Patent Application No. 200880119238.9 (4 pages total).

* cited by examiner

INTERLACING WIRELESS COMMUNICATION FRAMES

CROSS REFERENCE

This application is a Continuation of U.S. application Ser. No. 12/268,692 filed Nov. 11, 2008 which claims the benefit of U.S. provisional patent application 60/992,849, filed Dec. 6, 2007, entitled "Interlacing Shortened 802.16M Subframes As Legacy 802.16 Frames", the entire content of which is incorporated by reference herein in its entirety.

TECHNICAL FIELD

The disclosed technology relates to interlacing wireless communication frames for use in communications between user equipments and base station in a wireless network.

BACKGROUND

In existing communication systems (legacy systems) such as an 802.16e system, a communication frame has a specified duration such as 5 ms. In the case of a system based on time division duplexing (TDD), the legacy communication frame (or simply "legacy frame") is structured to be divided in time into a DL (downlink) portion and a UL (uplink) as illustrated in FIG. 1. In the legacy frame, guard periods TTG and RTG between the DL and UL portions serve as transition gaps to allow a user equipment of the wireless network to transition between receiving/transmitting signals (data and control) from/to a base station.

The structure of the legacy frame starts with a preamble which serves as a synchronization point for the communication between the base station and the user equipment. Also in the preamble, a cell identity is provided. That is, the cell identity within the preamble associates the legacy frame to a base station and sector.

The preamble is followed by a DL-MAP which identifies a receiving schedule for the user equipments being served by the base station. For a particular user equipment, the DL-MAP specifies which of the downlink resources, i.e., DL bursts, has been scheduled for the user equipment. The legacy frame structure also includes a UL-MAP which specifies a sending schedule for the user equipment. That is, the UL-MAP specifies which of the UL bursts has been scheduled so that the user equipment can send signals to the base station. The UL-MAP is typically provided to the user equipments in the downlink resource DL burst #1.

During operation, when the frame adhering to the legacy frame structure is received, the user equipment identifies the particular downlink and uplink resources scheduled for it and uses the identified resources and ignores the remaining resources of the frame. For example, if the DL-MAP indicates that DL burst #2 and UL burst #3 are scheduled for the user equipment, then the user equipment will listen for messages from the base station on the DL burst #2 and send messages on the UL burst #3. All other DL bursts and UL bursts are ignored by the user equipment.

While the duration of the legacy frame is fixed to 5 ms, the ratio of DL/UL portions is configurable. In FIG. 1, this means that the position of the guard period TTG is not fixed within the legacy frame. If the TTG is moved to the right, then a greater portion of the legacy frame is devoted to downlink transmissions, i.e., from the base station to the user equipments. The system is typically configured in this way if the DL traffic is expected to be larger than the UL traffic. Conversely, if the TTG is moved to the left, then a greater portion of the legacy frame is devoted to uplink transmissions. In principle the DL:UL asymmetry can be changed dynamically, but in practice the system is typically configured with a fixed DL:UL asymmetry which is the same in all cells, to avoid interference problems.

It is desirable to reduce latency both for data and control signaling. Reduced latency is important in it's own right for services that are sensitive to latency. Reduced latency, e.g., for reporting of channel measurements, can also improve system capacity and user throughput. One way to reduce the latency is to introduce shorter mini-frames inside the structure of the legacy frame as illustrated in FIG. 2. In this figure, a structure of a low-latency 802.16m frame is illustrated. The duration of the low-latency frame is the same as the legacy frame, i.e., 5 ms. However, within the low-latency frame, there are two mini-frames. As an example, each mini-frame of the low-latency frame structure can have equal duration of 2.5 ms. The first mini-frame contains a downlink portion DL-1 followed by an uplink portion UL-1. Similarly, the second mini-frame contains a downlink portion DL-2 followed by an uplink portion UL-2. Thus, in FIG. 2, the sequence of the portions within the structure of the low-latency frame is DL-1, UL-1, DL-2, and finally UL-2.

At least two problems are identified. First is the problem of a coexistence of the low-latency system with the legacy system. In FIG. 3, simplified views of the structures of the low-latency and the legacy frames are illustrated. As seen, the UL-1 portion of the low-latency frame overlaps with a part of the DL portion of the legacy frame. Similarly, the DL-2 portion of the low-latency frame overlaps with a part of the UL portion of the legacy frame. This means that if the low-latency base station is geographically co-located or located adjacent to the legacy base station, there can be simultaneous uplink and downlink transmissions. This can cause unwanted interferences.

One way to mitigate this interference problem is to simply reconfigure the legacy base station to introduce a blank period in the structure of the legacy frame to prevent simultaneous DL and UL transmissions. As illustrated in FIG. 4, the legacy base station can be designed to send legacy frames with blank periods that coincide with the UL-1 and DL-2 portions of the low-latency frames sent by the low-latency base station. During the blank period, neither the DL nor the UL resources are allocated by the legacy base station.

To the legacy user equipment (or terminal), since no resources are scheduled for itself in the blank period, the blank period appears merely as a part of the DL portion and UL portion that are scheduled for other user equipments, and thus are ignored. While the blank period prevents interferences, it does so at the cost of wasting valuable radio resources from being used in the legacy system.

The second problem is related to enabling backwards compatibility support of legacy user equipments with a low-latency base station. As illustrated in FIG. 5, this can be addressed by scheduling the resources for the legacy user equipments only in the DL-1 and UL-2 portions of the low-latency frame. That is, the scheduler in the low-latency base station will not schedule the resources in the portions UL-1 and DL-2 for communications with the legacy user equipments (as indicated by the diagonal hashing). Again from the perspective of the legacy user equipment, the UL-1 and DL-2 portions are simply treated as DL and UL resources scheduled for other user equipments and are ignored.

However, when the low-latency base station is initially installed, it is likely that a great majority of the user equipments it serves will be legacy based and very few will be low-latency user equipments. This again means that valuable radio resources will not be fully utilized.

SUMMARY

In one aspect of the disclosed technology, a legacy base station is modified to transmit multiple legacy frames in an interlaced manner. By interlacing the frames of adhering to the legacy frame structure, valuable radio resources are utilized through eliminating or reducing the blank periods without causing interference with the neighboring or co-located base stations implementing the low-latency frame structure. To the legacy user equipments, the interlaced frame appears as multiple normal legacy frames transmitted from multiple base stations and/or sectors. That is, the interlaced frame appears as multiple normal legacy frames transmitted from multiple cells.

In one embodiment, the base station allocates radio resources for a user equipment in frames of a plurality of types including first and second frame types. Each frame includes a preamble distinguishing the frame from frames of other frame types. The base station forms the interlaced frame by interlacing the frames of the plurality of frame types. The interlacing is so that a downlink portion of a frame of one frame type does not overlap with an uplink portion of a frame of any other frame type, and an uplink portion of the frame of the one frame type does not overlap with a downlink portion of the frame of the any other frame type. The base station communicates with the user equipment according to the interlaced frame. The frames of each type includes information, e.g., a cell ID, which permits the user equipment to identify the frames of each type as being associated with different cells.

Each frame of the first and second frame types includes a blank period in which no uplink or downlink communications are scheduled. The frames of the plurality of frame types are interlaced so that the uplink and downlink portions of a frame of one frame type overlaps the blank period of a frame of another frame type so that in the resulting interlaced frame, the blank period is eliminated or reduced significantly. In this manner, simultaneous uplink and downlink communications are prevented which in turn preventing interferences while significantly increasing the use of valuable radio resources.

In addition, the downlink portions of the interlaced frames are scheduled to prevent overlap with any uplink portions of a low-latency frame used by a neighboring or co-located low-latency base station. Similarly, the uplink portions of the interlaced frames are scheduled to prevent overlap with the downlink portions of the neighboring low-latency frames again to prevent interferences. It should be noted that the downlink and the uplink portions of the interlaced frames can overlap respectively with the downlink and uplink portions of the neighboring low-latency frames.

In another embodiment, the low-latency frame is modified to appear as multiple legacy frames to a legacy user equipment. This allows a pure low-latency base station to serve legacy user equipments without wasting valuable radio resources. To a low-latency user equipment, the modified low-latency frames still appear as normal low-latency frames. In this way, the modified low-latency frames can be used to serve both legacy and low-latency user equipments concurrently by devoting some of the downlink and uplink resources for exclusive use by the low-latency user equipment.

In a further embodiment, macro diversity techniques is used to enhance throughput to the user equipment. If the user equipment is capable of performing macro diversity functions, i.e., be in communications with multiple cells simultaneously, then the radio resources of the frames of multiple types of the interlaced frame can be allocated to the user equipment. As an alternative, macro diversity can be used to enhance reliability of communication by transmitting the same data over the frame of multiple frame types.

As yet another alternative, the downlink resource allocation map of a frame of one frame type of the interlaced frame can be used to identify the downlink resources of a frame of another frame type for the user equipment.

In yet another embodiment, the base station may switch the user equipment from communicating over the frame of one frame type of the interlaced frame to the frame of another frame type, i.e. a normal handoff procedure, e.g., for load balancing purposes.

Advantages of the embodiments include at least the following. First, valuable radio resources are fully utilized by interlacing multiple legacy frames. Interlacing multiple blanked-out legacy frames enables full usage of the available radio resources in areas where the capacity loss introduced by the blanking out of the frames is not tolerable. Second, waste of radio resources is prevented by designing the low-latency frames to appear as multiple blanked-out legacy frames to a legacy user equipment. In this manner, all parts of the low-latency frame can be used for the legacy terminals, and thus, enable full usage of the available radio resources even when the legacy user terminals dominate in the areas served by the low-latency base station.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 9:
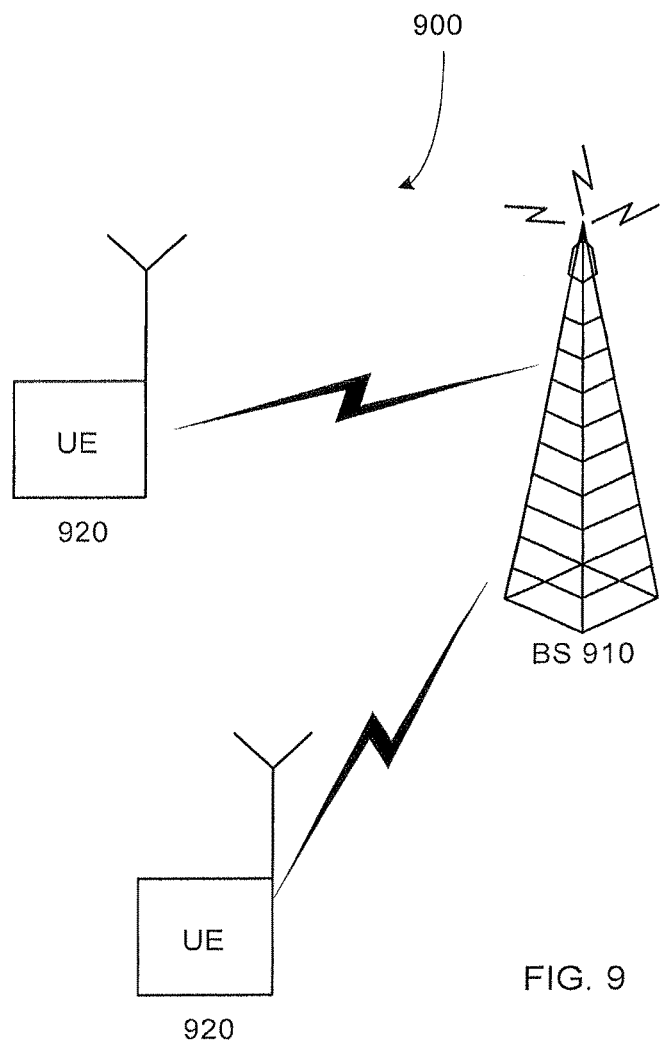
FIG. 9 illustrates an example wireless network.

FIG. 9 illustrates an embodiment of a wireless network 900 in which communications between the base station 910 and the user equipments 920 can be accomplished based on the interlaced frame structures as discussed. In this figure, the user equipments 920 are assumed to be legacy user equipments. The base station 910 can either be a legacy base station modified to use the interlaced frame structure or can be a low-latency base station using the modified low-latency frame structure.

Figure 10:
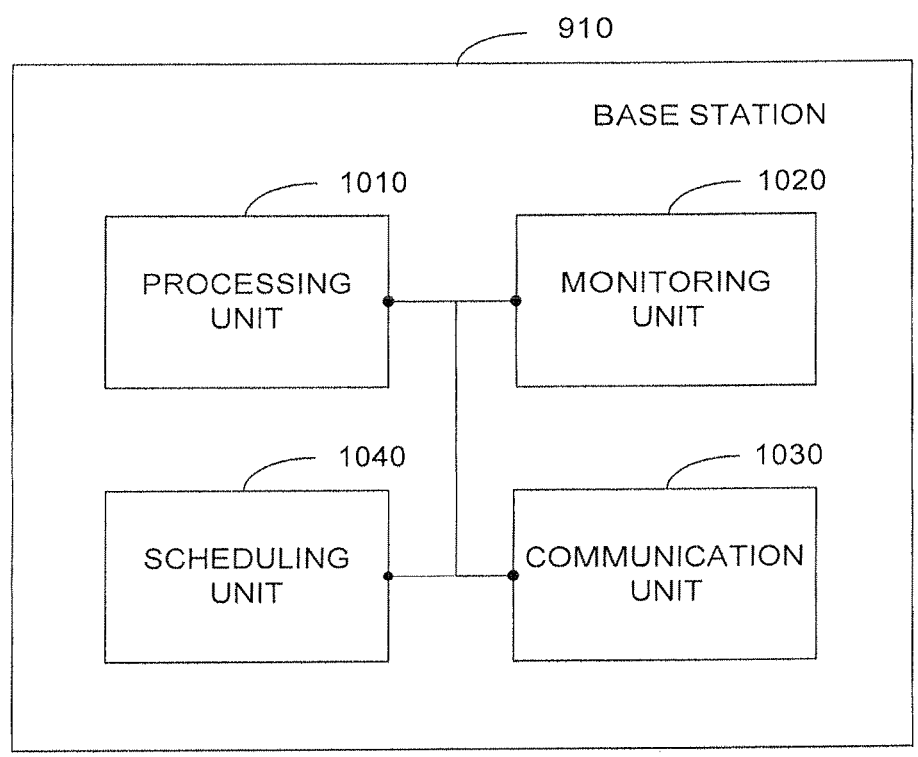
FIG. 10 illustrates an embodiment of the base station.

FIG. 10 illustrates an embodiment of the base station 910. The base station 910 includes a processing unit 1010, a monitoring unit 1020, a communications unit 1030, and a scheduling unit 1040. The monitoring unit 1020 is arranged to monitor the status of the network 900 including the load on each of the individual frames of the interlaced frame. The communication unit 1030 is arranged to communicate with the user equipment 920 in the network. The scheduling unit 1040 is arranged to schedule the uplink and downlink resources for the user equipments 920. The processing unit 1010 is arranged to control the operations of the various components of the base station 910 including the monitoring unit 1020, the communications unit 1030 and the scheduling unit 1040 to perform the methods as will be described below.

Figure 11:
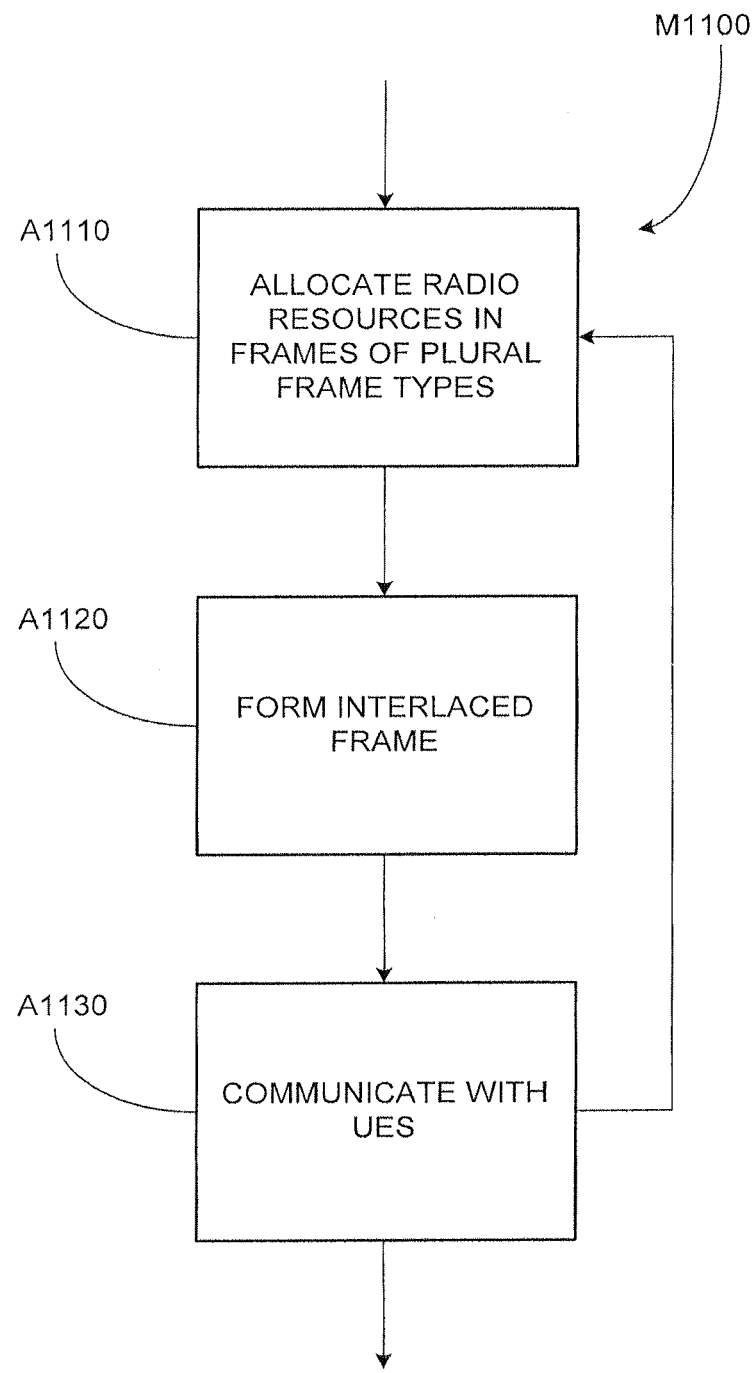
FIG. 11 illustrates an example method of operating a base station to serve legacy user equipments in a wireless network.

FIG. 11 illustrates a method of operating the base station 910 in the network 900 so that the radio resources of the base station 910 are optimally utilized. In A1110, the base station 910 allocates radio resources for the user equipments 920 in frames of a plurality of frame types including first and second frame types. In one embodiment, the structures of the first and second frame types are modified versions of the legacy frame structure to appear as if they are from two different cells.

The structure of each frame type includes a synchronization channel serving as a synchronization point for communication between the user equipments 920 and the base station 910. The structure also includes a cell ID which can be included in the synchronization channel or in other control channel of the frame structure. The cell ID allows the user equipments 920 to identify the base station 910 and a particular sector of the base station 910 if sectoring is used.

Note that for each frame type, the cell ID is different. To the legacy user equipments 920, the frames of the first frame type appear as legacy frames from a first legacy cell and the frames of the second frame type appear as legacy frames from a second legacy cell different from the first legacy cell even though in actuality, the frames are from the same base station 910. The cell ID can be associated with a particular base station or a combination of the base station and a particular sector.

Figure 1:
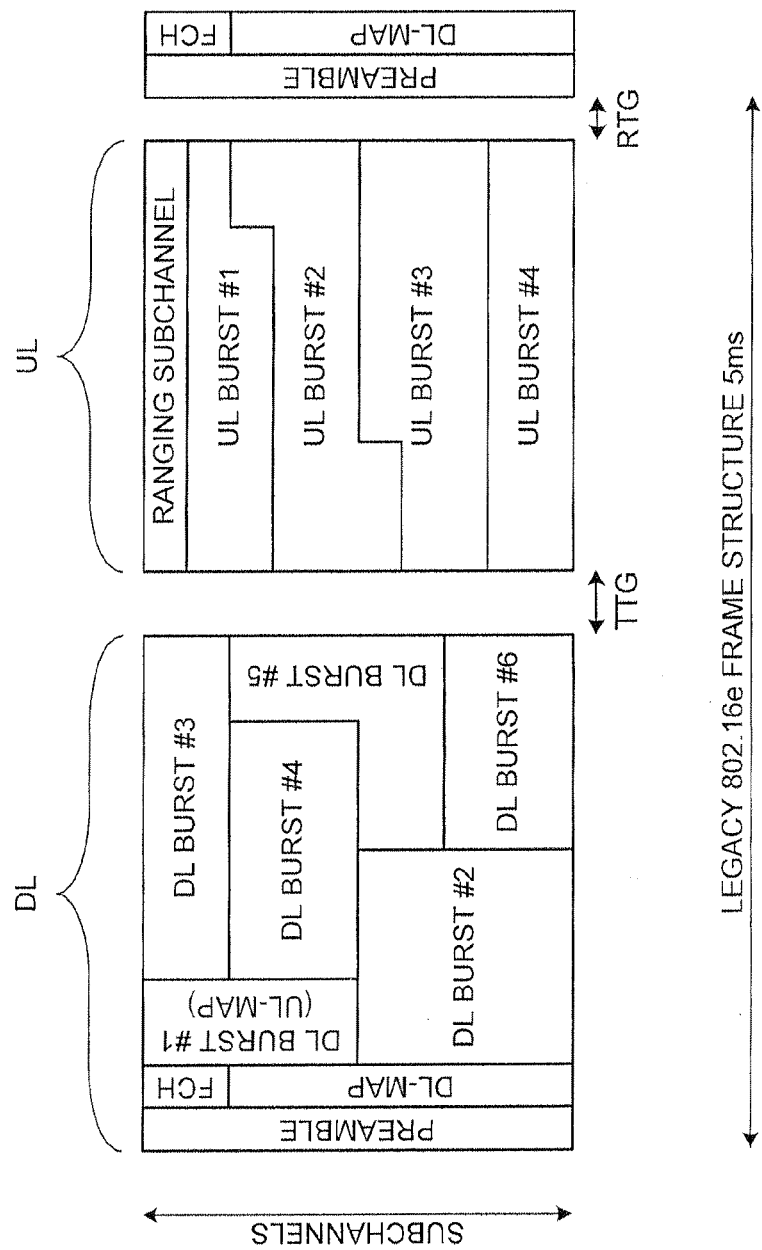
FIG. 1 illustrates an example structure of a legacy communication frame.
Figure 2:
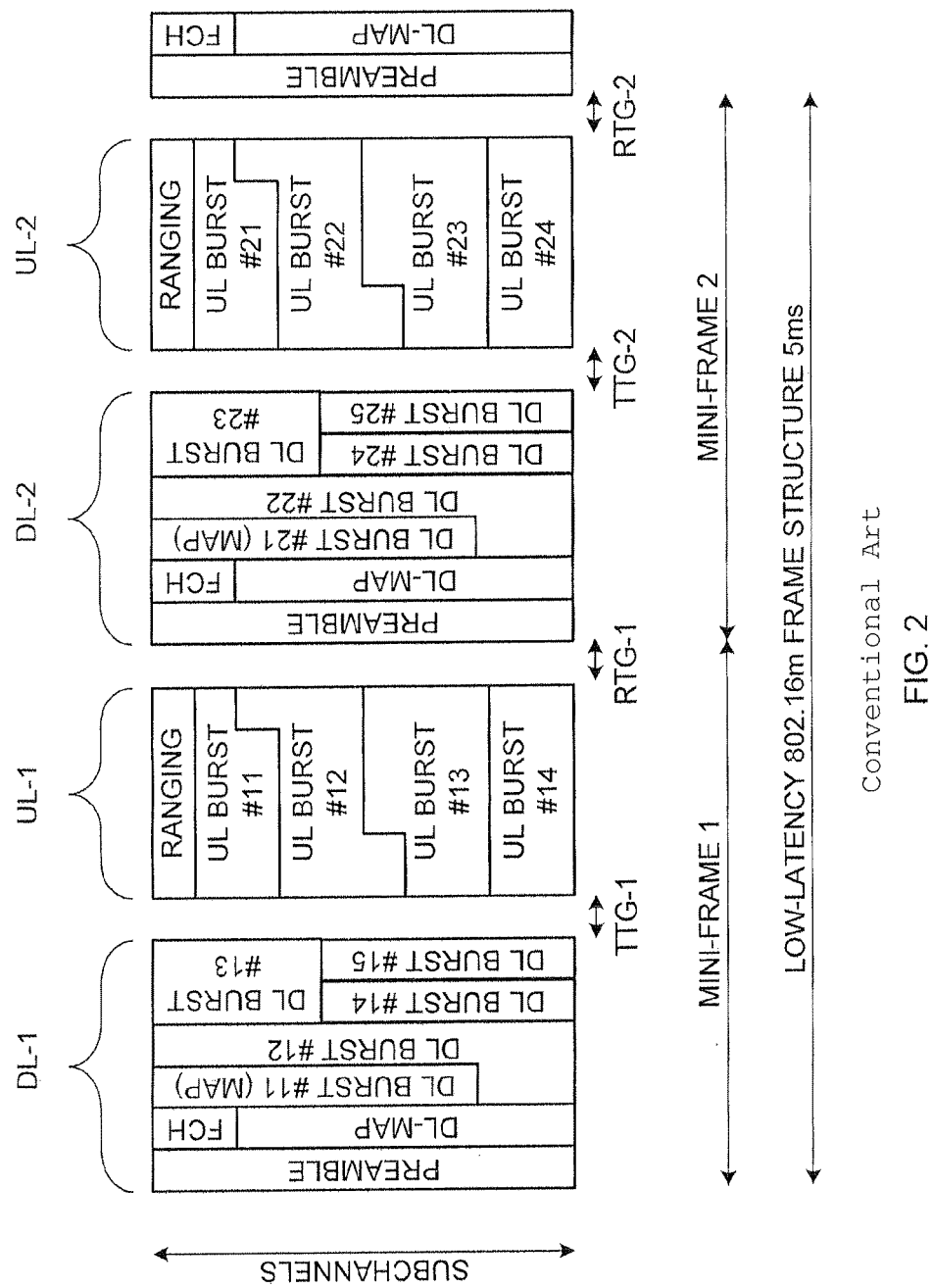
FIG. 2 illustrates a structure of an example low-latency communication frame.
Figure 3:
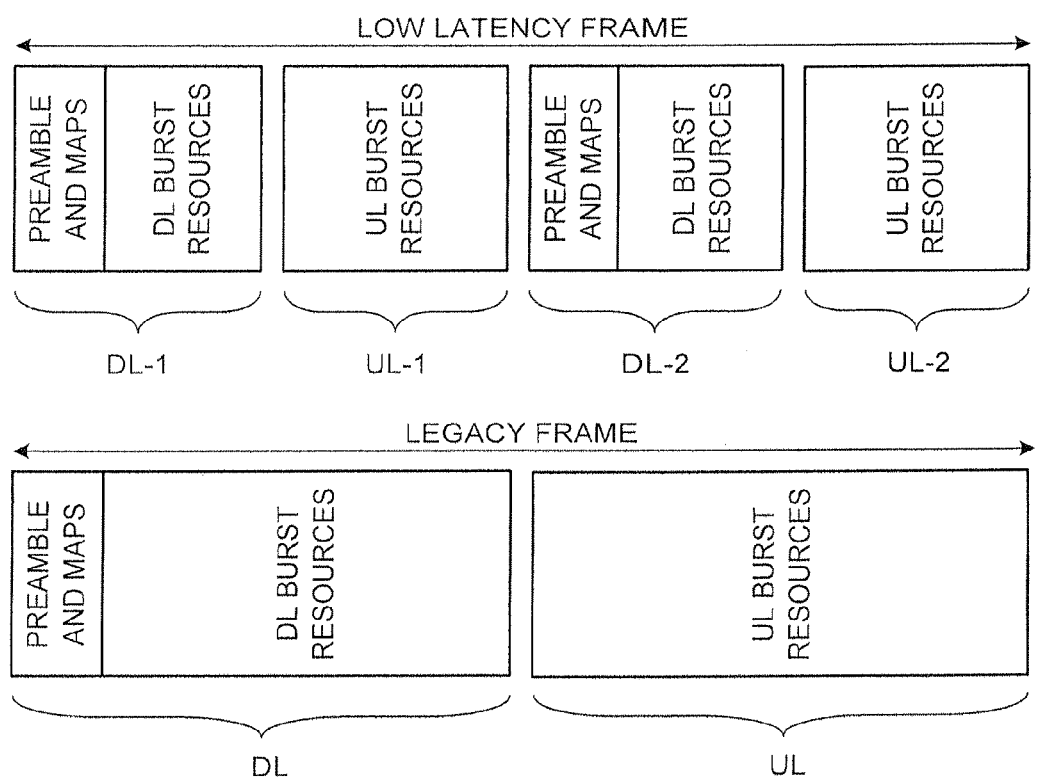
FIG. 3 illustrates a problem caused by co-locating low-latency and legacy base stations.
Figure 4:
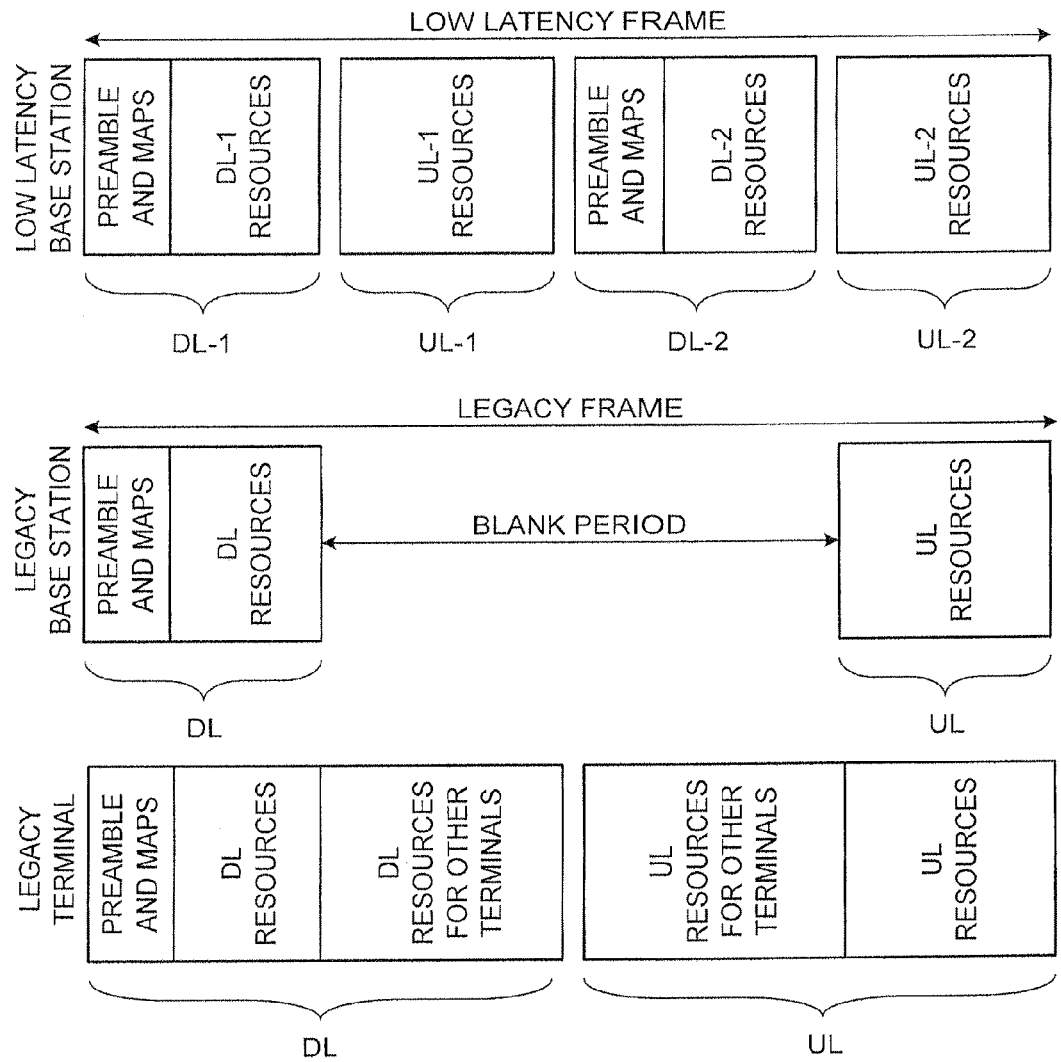
FIG. 4 illustrates a non-optimum adaptation of the legacy frame structure to reduce interference with co-located low-latency base stations.
Figure 5:
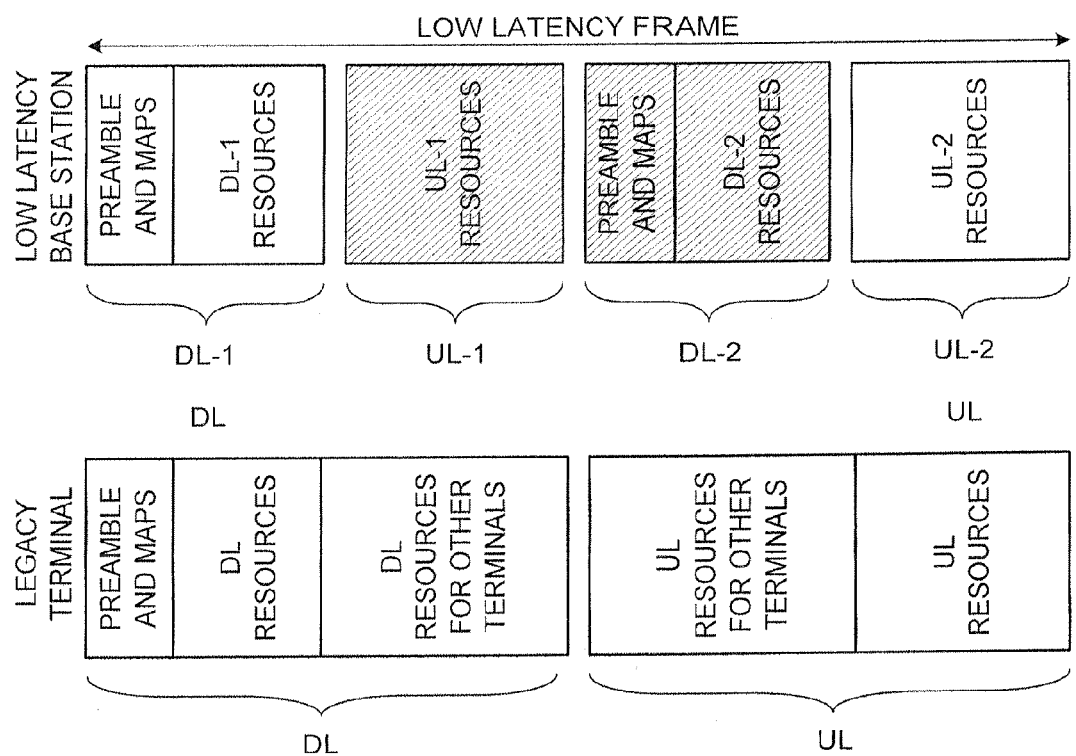
FIG. 5 illustrates a non-optimum adaptation of the low-latency frame structure to serve the legacy user equipments.
Figure 6:
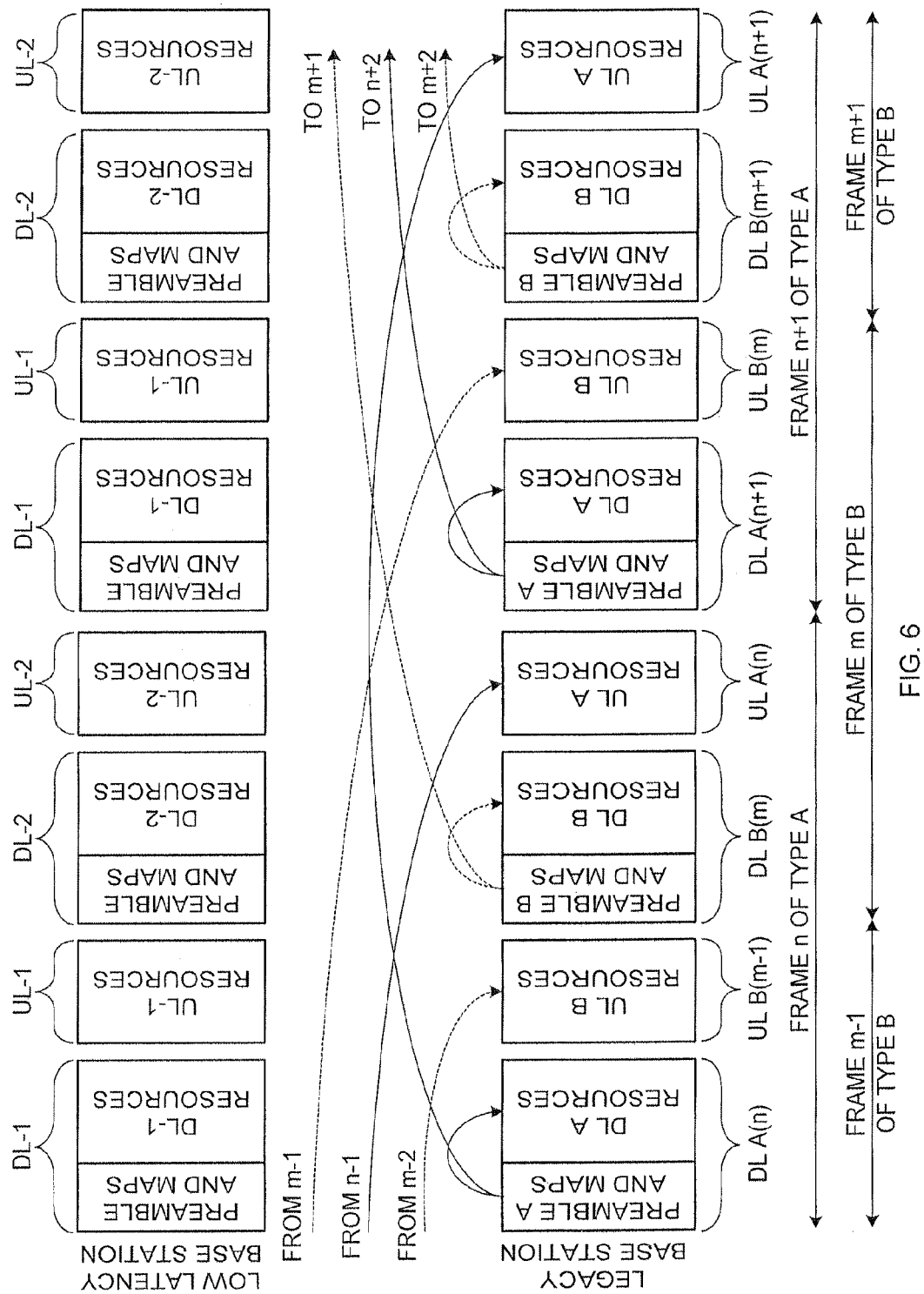
FIG. 6 illustrates an embodiment in which multiple legacy frames are transmitted in an interlaced manner to fully utilize the radio resources without causing interferences with neighboring base stations implementing the low-latency frame structure.

In A1120, the base station 910 forms the interlaced frames by interlacing the frames of the plurality of frame types. The interlacing is such that the downlink portion of a frame of one frame type does not overlap with an uplink portion of a frame of any other frame type. Conversely, an uplink portion of the frame of the one frame type does not overlap with a downlink portion of the frame of any other frame type. This is explained with reference to FIG. 6, which illustrates a legacy base station 910 that has been modified to transmit the interlaced frames. For simplicity of explanation, the legacy base station in FIG. 6 is assumed to form interlaced frames from frames of two frame types—type A and type B—both of which are modified versions of the legacy frame structure. The frame of type A is referred to as "frame A" and the frame of type B is referred to as "frame B" for brevity. As noted, to the legacy user equipment, frames A appear as legacy frames from cell A and frames B appear as legacy frames from cell B.

In FIG. 6, the example interlaced frames are formed by interlacing frames of type A (e.g., A(n) followed by A(n+1)) with frames of type B (e.g., half of B(m−1) followed by B(m) followed by half of B(m+1)). As indicated by the arrows above the legacy base station frames, the preamble and the downlink and uplink resource allocation maps (e.g., DL-MAP and UL-MAP) of the frames A identify downlink and uplink resources of the frames A (solid-line arrows). Likewise, the preamble and the maps of the frames B identify the downlink and uplink resources of the frame Bs (dashed-line arrows).

In particular example illustrated in FIG. 6, the downlink maps identify downlink resources for the terminal in the same frame. However, the uplink maps identify uplink resources for the terminal in the next frame. For example, in the preamble A and maps of frame A(n), the allocated downlink resources DL A(n)—which is in the same frame—are identified for the legacy user equipment communicating with the base station over type A frames. However, from frame A(n), uplink resources UL A(n+1) of the next frame are identified. As another example, the allocated uplink resources UL A(n) in the current frame are identified in the previous frame A(n−1). One advantage of identifying uplink resources in the next or any future frame is that it allows more processing time for the user equipment from scheduling to transmission.

It should be noted this is one of many possibilities. While not explicitly shown, the uplink maps can identify uplink resources allocated for the user equipment in any other future frames and is not limited to the next frame only. For delay tolerant transmissions, scheduling uplink transmission from the user equipment far off into the future may be acceptable. Of course, a maximum tolerable delay may be set.

Indeed, the uplink maps can identify uplink resources within the current frame as well. For transmissions that are less tolerant of delays, scheduling uplink transmission as soon as possible would be an advantage. Of course, the user equipment should have the appropriate processing capability. Depending on the type of transmission (web browsing, video/audio streaming, VoIP, etc.), different levels of maximum tolerable delays may be set.

Also while not shown, it is to be noted that similar flexibility in allocating resources for downlink transmissions is possible. Again, for delay tolerant transmission (such as FTP download), scheduling flexibility may provide opportunities to more efficiently utilize the network resources. Also, a user may opt for lower subscription price in exchange for tolerating greater delays.

Referring back to FIG. 6, when type A and B frames are interlaced, the order of the interlaced frame structure is as follows. First, the preamble (PREAMBLE A) and the downlink resources (DL-A) of frame A is followed by the uplink resources (UL-B) of frame B, which is then followed by the preamble (PREAMBLE B) and the downlink resources (DL-B) of the frame B and then the uplink resources (UL-A) of the frame A. This sequence is repeated in the interlaced frames.

While the frames A and B overlap in time duration, the DL-As do not overlap with the UL-Bs and the UL-As do not overlap with the DL-Bs in the interlaced frame. Note that the modified legacy frames—the frames A and B—also avoid conflicts with the low-latency frame structure, i.e., there are no simultaneous uplink and downlink transmissions between the legacy base station and the low-latency base station.

Figure 7:
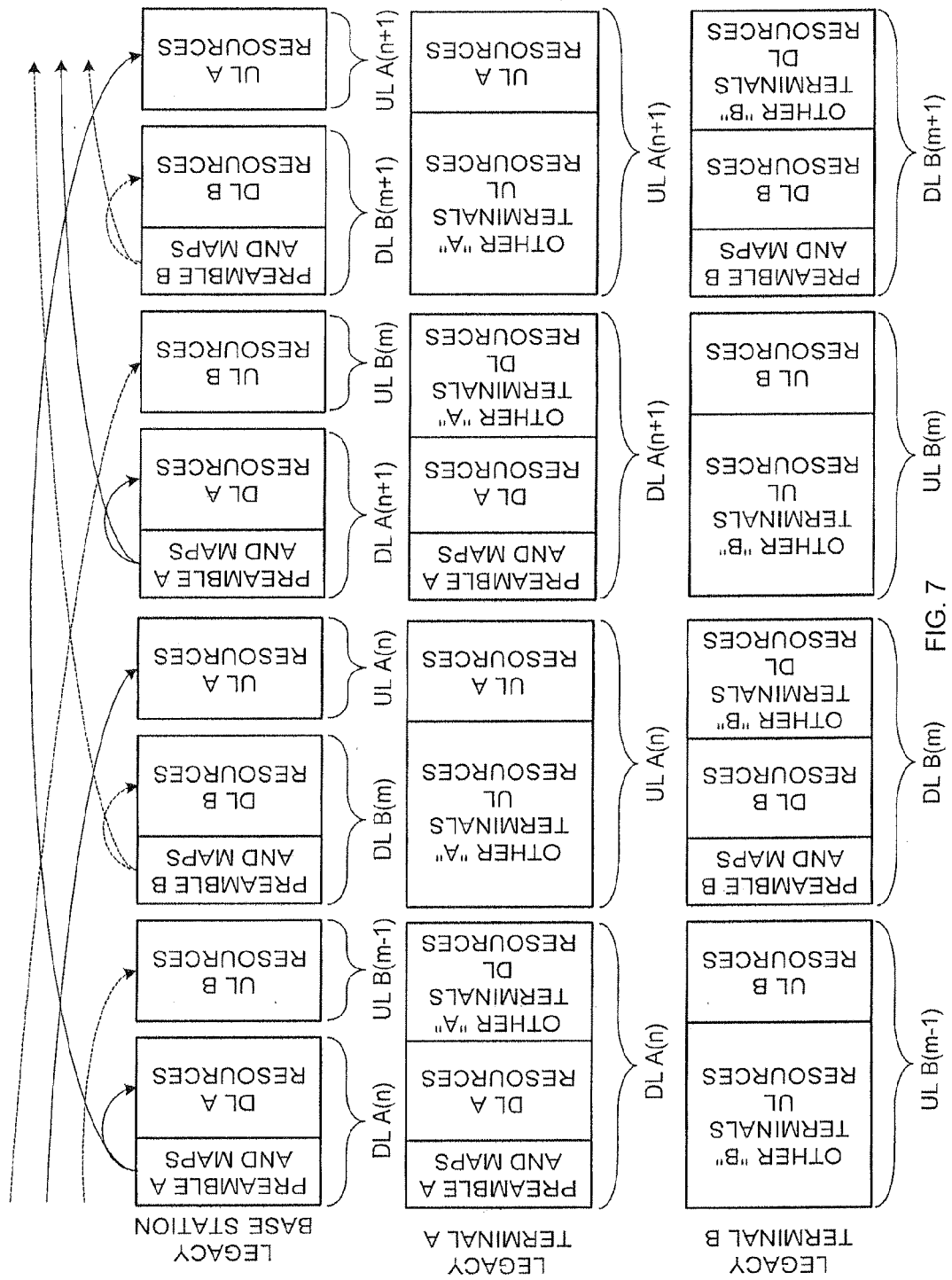
FIG. 7 illustrates the perspective of the legacy user equipments of the interlaced legacy frame structure.

As shown in FIG. 7, the interlaced frames appear as two ordinary legacy frames from two different cells A and B. Each legacy user equipment will typically listen on one of frames A and B. Thus, from the perspective of the legacy user equipments, full bandwidth is not utilized. However, from the perspective of the system, i.e. the base station, little to no capacity is lost since frames of all frame types such as frames A and B are used for communications with the user equipments. The loss in terms of overhead for the additional preambles is relatively small. Thus, the interlaced frames can support close to full downlink data capacity.

Figure 8A:
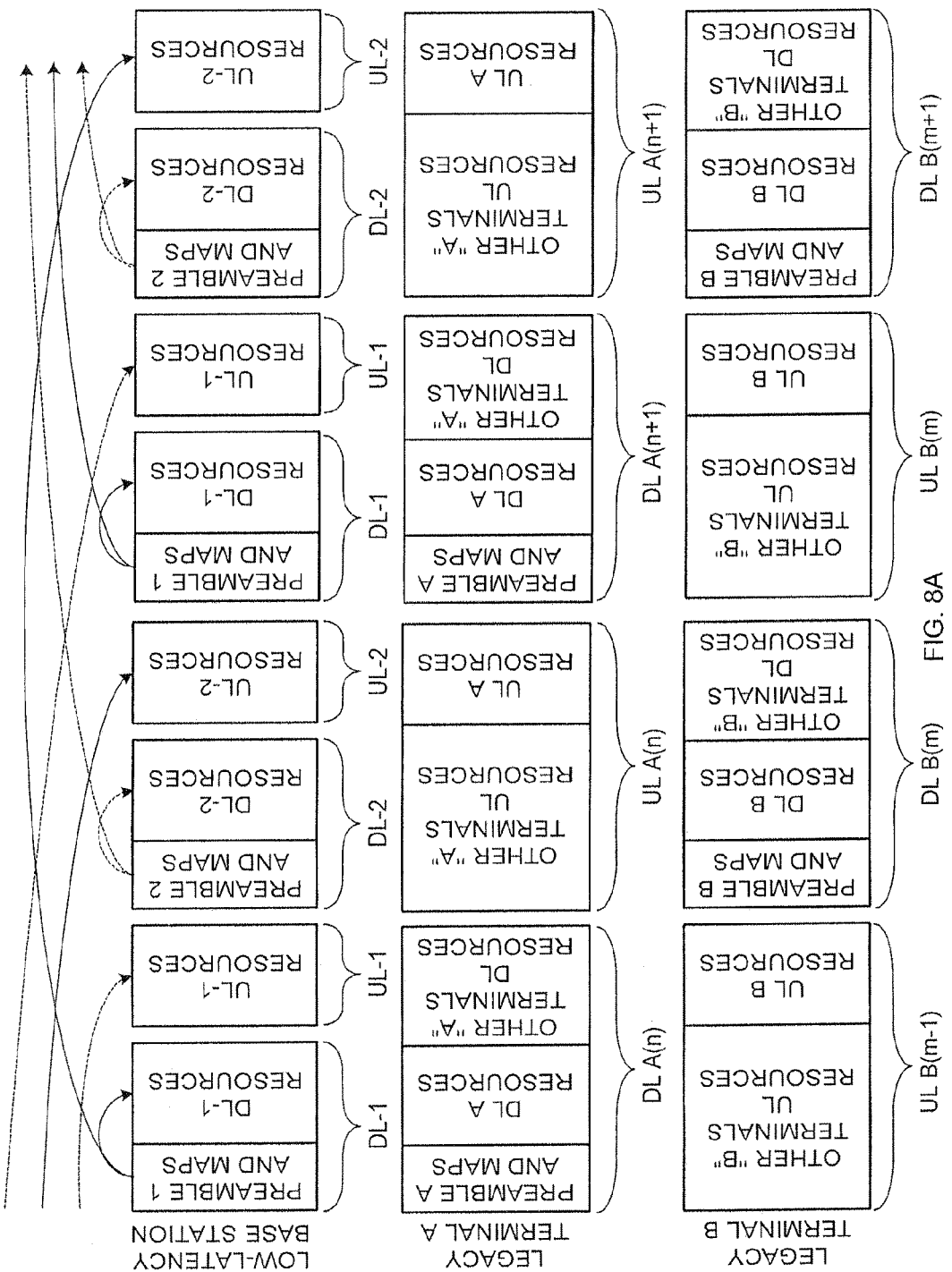
FIG. 8A illustrates a modification of the low-latency frame structure to serve the legacy user equipments.

For the base station implementing the low-latency frame, the low-latency frames can be modified to mimic the interlaced frames as illustrated in FIG. 8A. As seen, the mini-frames of the low-latency frames are used so that they appear to the legacy terminals as legacy frames from two different cells.

Figure 8B:
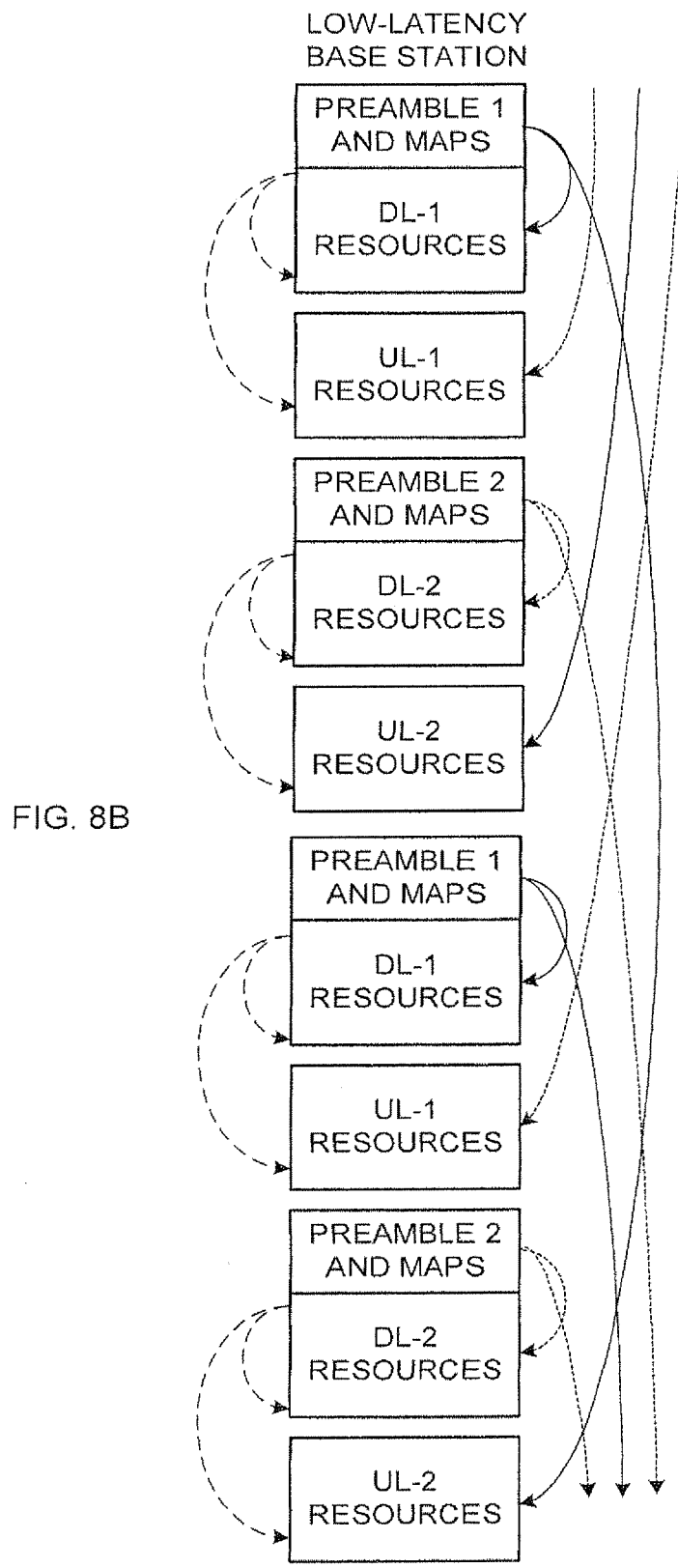
FIG. 8B illustrates a use of the modified low-latency frame structure to concurrently serve the low-latency and legacy user equipments.

Even though the modified low-latency frame appear as normal legacy frames to legacy user equipments, to the low-latency user equipment, the modified low-latency frame would still adhere to the low-latency frame structure, i.e., appear as normal low-latency frames. This is illustrated in FIG. 8B. In this figure, mini frames, DL-1, UL-1, DL-2, UL-2 of the modified low-latency frames may in addition contain resources for exclusive use for low-latency user equipments (large dashed-line arrows below the frames). These resources may be used for low-latency exclusive control signaling e.g. of scheduling information and synchronization, and for low-latency exclusive user data transmission. These low-latency exclusive resources may be time and/or frequency multiplexed with the resources used for legacy terminals. In the case of the low-latency base station, the scheduling unit should ensure that the resources allocated to the low-latency user equipment are not allocated to the legacy user equipments.

Referring back to FIG. 11, after forming the interlaced frame, the base station 910 communicates with the user equipments 920 according to the interlaced frames in A1130. The interlaced frames include information to permit the user equipment 920 to identify frames of the different frame types where each frame type is associated with the different cells. That is, the interlaced frames include information to identify frames of the first frame type as being associated with the first cell and identify frames of the second frame type as being associated with the second cell, which is different from the first cell.

In one example, the frames of the first and second frame types adhere to the structure of the legacy 802.16e frames each with different cell IDs, and the interlaced frame is formed by interlacing the frames of the legacy 802.16e frame structures. Each frame of the first and second frame types includes a blank period in between the downlink portion and the uplink portion so that no uplink and downlink communications are simultaneously scheduled in the interlaced frame. Referring back to FIG. 6, the blank period for the frame A corresponds to UL-B and DL-B scheduled for the frame B. Similarly, the blank period for the frame B corresponds to UL-A and DL-A scheduled for the frame A. That is, the scheduling unit 1040 performs scheduling such that the frames A and B are interlaced to form the interlaced frames where the uplink and downlink resources of the frames A and B do not interfere with each other.

Again referring to FIG. 6, there are also no simultaneous uplink and downlink transmissions between the interlaced frames of the modified legacy base station and the low-latency frames of the low-latency base station. That is, the downlink resources (DL-A, DL-B) of the frames of the first and second frame types do not overlap with any uplink resources (UL-1, UL-2) of the low-latency frame used by the neighboring base station. Similarly, the uplink resources (UL-A, UL-B) of the first and second frame type frames do not overlap with any downlink resources (DL-1, DL-2) of the low-latency frame. However, note that the simultaneous uplink or downlink transmissions are allowed. That is to say, the resources DL-A and DL-B are allowed to overlap with DL-1 and DL-2, and the resources UL-A and UL-B are allowed to overlap with UL-1 and UL-2.

As noted above and illustrated in FIG. 8A, the low-latency frame can be designed to appear as two different legacy frames from two different cells to the legacy user equipments. This enables the low-latency base station to serve legacy user equipments without wasting valuable radio resources. As shown, the low-latency frame includes a first mini-frame with a first downlink (DL-1) and uplink (UL-1) portions, and a second mini-frame with a second downlink (DL-2) and uplink portions (DL-2). The first downlink portion DL-1 includes a first preamble, a first DL-MAP (downlink resource allocation map) and a first UL-MAP (uplink resource allocation map). The second downlink portion DL-2 includes a second preamble, a second DL-MAP and a second UL-MAP.

As indicated by the arrows, the resources identified in these resource maps are such that the first DL-MAP identifies the DL-1 resources in the first downlink portion and UL-2 resources in the second uplink portion of a future low-latency frame. Conversely, the second DL-MAP identifies DL-2 resources DL-2 in the second downlink portion and UL-1 resources of the first uplink portion of a future low-latency frame.

But also as noted above and illustrated in FIG. 8B, the low-latency frame can serve low-latency user equipments in addition to serving the legacy user equipments.

Figure 12:
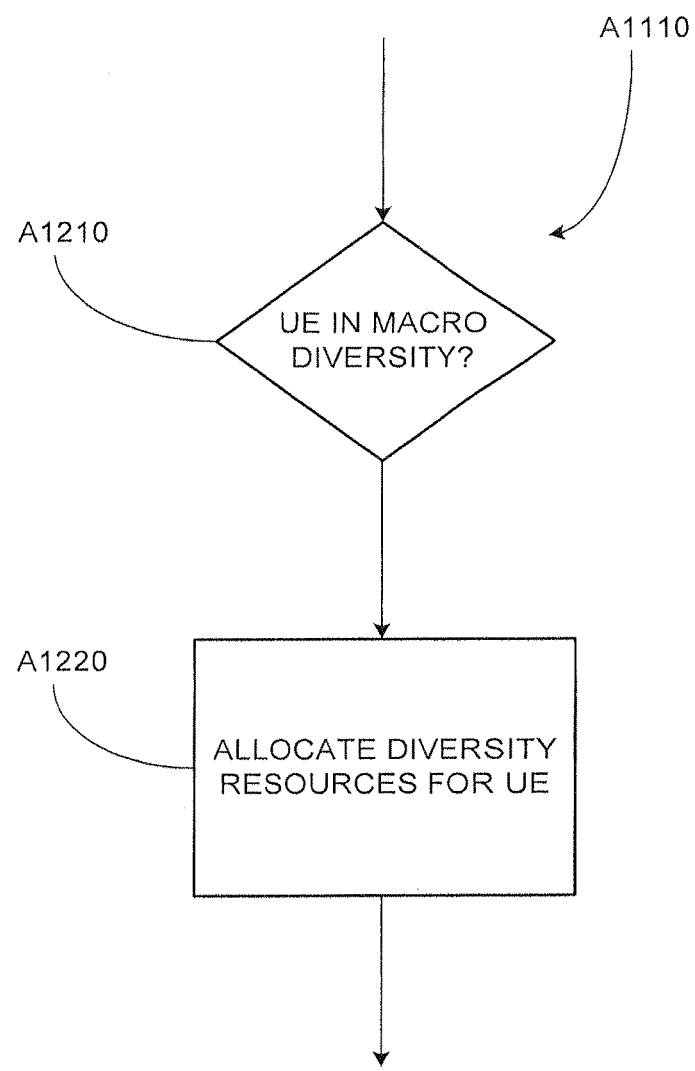
FIG. 12 illustrates an example method to utilize the macro diversity capacity of the user equipments.

FIG. 12 illustrates an embodiment of a method to implement A1110 of allocating the radio resources. In A1210, the base station determines whether the user equipment is in a macro diversity connection with the frames of the plurality of frame types such. For example, the user equipment may be simultaneous connection with both frames A and B of the interlaced frame. Note that the user equipment must have the capability for such a connection. If the user equipment is in the macro diversity connection, the base station allocates the radio resources so that at least some downlink resources of the both frames A and B are allocated for the user equipment in the interlaced frame in A1220.

When the user equipment is in the macro diversity connection with the frames A and B, then the reliability of communication can be enhanced with the user equipment by transmitting the data in the allocated downlink resources of frame A and transmitting the same data in the allocated downlink resources of frame B in A1130. Alternatively, throughput with the user equipment can be increased by transmitting different data in the allocated downlink resources of the frames A and B to the user equipment when the user equipment is in the macro diversity connection.

In one embodiment, downlink resources not only from DL-A of frame A but also from DL-B of frame B may be allocated to the same legacy user equipment such as the legacy terminal A in FIG. 7 without requiring macro diversity capabilities from terminal A. To allow such allocation of the DL-B resources based on legacy DL-MAP signaling in DL-A, the time interval between the start of frame A and the start of frame B should be an integer number of OFDM (orthogonal frequency division multiplex) symbols. More generally, the synchronization point of the frame A and the synchronization point of the frame B should be apart by an integer number of OFDM symbols.

Further more, the scheduling unit should ensure that the same resources in the DL-B are not allocated to both terminal A and terminal B. This improves the peak downlink rate for the legacy terminal A and also provides improved trunking efficiency system capacity. Similarly both DL-A and DL-B resources may be allocated to a terminal connected to the frames A.

As an enhancement, load balancing may be accomplished by using a handoff procedure. To a legacy user equipment entering a cell area served by the base station, it appears that there are at least two cells—cell A and cell B—with which the user equipment can establish a connection. The user equipment randomly chooses one or the other to establish the connection.

Figure 13:
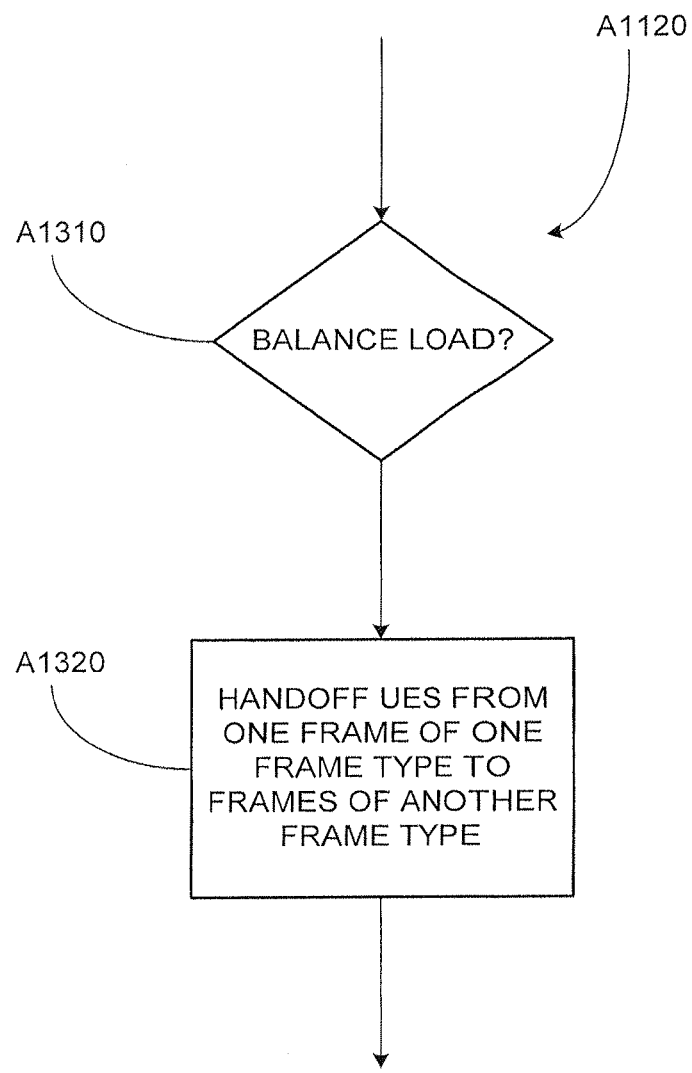
FIG. 13 illustrates a method to balance a load on the base station when interlaced frames are used.

As user equipments enter and leave the cell area, the loads on the frames can become unbalanced. That is, relatively many user equipments may be connected to the frames A and relatively few may be connected to the frames B, and/or the terminals connected to the frames A may generate more traffic than the terminals connected the frames B. FIG. 13 illustrates an example method to address this issue. The method illustrated in FIG. 13 can be viewed as an example implementation of A1120 of FIG. 11. In this method, the base station determines whether load balancing should be performed in A1310. If so, the base station initiates handoff procedures in A1320 so that one or more user equipments are handed off from the frames of more heavily used frame type (e.g., frames A) of the interlaced frame to the frames of a less heavily used frame type (e.g., frame B).

So that frequent handoff procedures do not occur, the handoff procedure can be performed only when the load unbalance is at or greater than a predetermined threshold. For example, the load balancing can be performed when a difference between a number of user equipments connected to the frames of one frame type and a number of user equipments connected to the frames of another frame type is a predetermined number or greater. In another example, a ratio of the number of user equipments connected to the frames of one frame type and to the frames of another frame type can be a predetermined ratio or greater. Alternatively the load balancing may be based on some other load measure such as an amount of data traffic carried, the bit rate requirements of the active connections, and so on.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method of operating a base station in a wireless network, comprising:

allocating radio resources for a user equipment in frames of a plurality of frame types including a first frame type and a second frame type, wherein each frame includes a preamble distinguishing that frame from frames of other frame types;

forming an interlaced frame by interlacing the frames of the plurality of frame types so that in the interlaced frame:

a downlink portion of a frame of the first frame type does not overlap with an uplink portion of a frame of the second frame type, and an uplink portion of the frame of the first frame type does not overlap with a downlink portion of the frame of the second frame type; and communicating with the user equipment according to the interlaced frame, wherein:

the interlaced frame comprises a plurality of sequences including a first sequence and a second sequence, each of the first sequence and the second sequence comprising a downlink portion followed by an uplink portion;

in the first sequence, the downlink portion includes a first synchronization point and downlink resources corresponding to the first frame type and the uplink portion includes uplink resources corresponding to the second frame type; and in the second sequence, the downlink portion includes a second synchronization point and downlink resources corresponding to the second frame type and the uplink portion includes uplink resources corresponding to the first frame type; and wherein the interlaced frame includes:
a first cell identifier indicating that one or more frames of the first frame type are associated with a first cell; and
a second cell identifier indicating that one or more frames of the second frame type are associated with a second cell, wherein the first cell identifier and the second cell identifier each correspond to a respective base station or a respective combination of a base station and a sector of the base station.

2. The method of claim 1, wherein the first frame type and the second frame type adhere to an 802.16e frame structure, and the interlaced frame is formed by interlacing frames of the first frame type and frames of the second frame type.

3. The method of claim 1, wherein:
the frames of the first and second frame types each include a blank period in between the downlink portion and the uplink portion so that no uplink and downlink communications are scheduled in the blank period; and
the frames of the first and second frame types are interlaced so that the uplink and downlink portions of any frame of the first frame type overlaps a blank period of a frame of the second frame type, wherein the uplink and downlink portions of any frame of the second frame type overlaps a blank period of a frame of the first frame type.

4. The method of claim 1, wherein:
frames of the first frame type are configured to carry a first preamble, a first DL-MAP, and a first UL-MAP in their downlink portion;
the first DL-MAP identifies downlink resources allocated within a current frame of the first frame type;
the first UL-MAP identifies uplink resources allocated within a future frame of the first frame type;
frames of the second frame type are configured to carry a second preamble, a second DL-MAP, and a second UL-MAP in their downlink portion;
the second DL-MAP identifies downlink resources allocated within a current frame of the second frame type; and
the second UL-MAP identifies uplink resources allocated within a future frame of the second frame type.

5. The method of claim 1, wherein:
the downlink portions of the interlaced frame sequences do not overlap with any uplink portions of a frame of a low-latency 802.16m frame structure used by a neighboring base station; and
the uplink portions of the interlaced frame sequences do not overlap with any downlink portions of the frame of the low-latency 802.16m frame structure used by the neighboring base station.

6. The method of claim 1, wherein in the interlaced frame:
the downlink portion of the frame of the first frame type overlaps a downlink portion of a first mini-frame of the low-latency 802.16m frame;
the uplink portion of the frame of the first frame type overlaps an uplink portion of a second mini-frame of the low-latency 802.16m frame;
the downlink portion of the frame of the second frame type overlaps a downlink portion of the second mini-frame of the low-latency 802.16m frame; and
the uplink portion of the frame of the second frame type overlaps an uplink portion of the first mini-frame of the low-latency 802.16m frame.

7. The method of claim 1, wherein the interlaced frame is a low-latency 802.16m frame modified to appear as two different 802.16e frames from two different cells directed to an 802.16e user equipment.

8. The method of claim 7, wherein
the modified low-latency 802.16mframe includes a first mini-frame with a first uplink portion and a first downlink portion and a second mini-frame with a second uplink portion and a second downlink portion;
the first downlink portion and the second uplink portion correspond to the frame of the first frame type; and
the second downlink portion and the first uplink portion correspond to the frame of the second frame type.

9. The method of claim 8, wherein
the first downlink portion includes a first preamble, a first DL-MAP, and a first UL-MAP;
the second downlink portion includes a second preamble, a second DL-MAP, and a second UL-MAP;
the first DL-MAP identifies downlink resources for the 802.16e user equipment in the first downlink portion of a current 802.16m frame;
the first UL-MAP identifies uplink resources for the 802.16e user equipment in the second uplink portion of a first future low-latency 802.16m frame;
the second DL-MAP identifies downlink resources for the 802.16e user equipment in the second downlink portion of the current 802.16m frame; and
the second UL-MAP identifies uplink resources for the 802.16e user equipment in the first uplink portion of a second future low-latency 802.16m frame.

10. The method of claim 7, wherein
the modified low-latency frame appears as a normal low-latency frame to an 802.16m user equipment; and
the modified low-latency frame includes allocation of resources for exclusive use by the 802.16m user equipment.

11. The method of claim 1, wherein allocating the radio resources comprises:
determining whether the user equipment is in a macro diversity connection with the frames of the first and second frame types of the interlaced frame; and
allocating the radio resources so that downlink resources of the frames of both the first and second frame types are allocated for the user equipment in the interlaced frame.

12. The method of claim 11, wherein communicating with the user equipment comprises transmitting same data in the downlink resources of the frames of both the first and second frame types to the user equipment in the macro diversity connection.

13. The method of claim 11, wherein communicating with the user equipment comprises transmitting different data in the downlink resources of the frames of both the first and second frame types to the user equipment in the macro diversity connection.

14. The method of claim 1, wherein allocating the radio resources comprises:
allocating downlink resources in the frame of the second frame type for the user equipment; and
indicating the allocation in a downlink resource allocation map in the frame of the first frame type.

15. The method of claim 14, wherein a duration between a synchronization point of the frame of the first frame type and a synchronization point of the frame of the second frame type is an integer number of orthogonal frequency division multiplex (OFDM) symbols.

16. The method of claim 1, wherein communicating with the user equipment comprises:

determining whether load balancing should be performed; and handing off the user equipment from the frames of the first frame type to the frames of the second frame type in response to determining that load balancing should be performed.

17. The method of claim 16, wherein in the step of determining whether the load balancing should be performed, the determination is based on any one or more of:

numbers of user equipments connected to the frames of the first and second frame types; and required bit rates of the user equipments connected to the frames of the first and second frame types.

18. A base station of a wireless network, comprising:

a communication unit configured to transmit information to one or more user equipments; and a processor configured to:

allocate radio resources for a first user equipment in frames of a plurality of frame types including a first frame type and a second frame type, wherein each frame includes a preamble distinguishing that frame from frames of other frame types;

form an interlaced frame by interlacing the frames of the plurality of frame types so that in the interlaced frame, a downlink portion of a frame of the first frame type does not overlap with an uplink portion of a frame of the second frame type, and an uplink portion of the frame of the first frame type does not overlap with a downlink portion of the frame of the second frame type; and communicate, via the communication unit with the user equipment according to the interlaced frame, wherein:

the interlaced frame comprises a plurality of sequences including a first sequence and a second sequence, each of the first sequence and the second sequence comprising a downlink portion followed by an uplink portion, in the first sequence, the downlink portion includes a first synchronization point and downlink resources corresponding to the first frame type and the uplink portion includes uplink resources corresponding to the second frame type; and in the second sequence immediately subsequent to the first sequence, the downlink portion includes a second synchronization point and downlink resources corresponding to the second frame type and the uplink portion includes uplink resources corresponding to the first frame type; and wherein the interlaced frame includes:

a first cell identifier indicating that one or more frames of the first frame type are associated with a first cell; and a second cell identifier indicating that one or more frames of the second frame type are associated with a second cell, wherein the first cell identifier and the second cell identifier each correspond to a respective base station or a respective combination of a base station and a sector of the base station.

* * * * *

UNITED STATES PATENT AND TRADEMARK OFFICE
CERTIFICATE OF CORRECTION

| | | |
|---|---|---|
| PATENT NO. | : 9,100,949 B2 | Page 1 of 1 |
| APPLICATION NO. | : 13/933979 | |
| DATED | : August 4, 2015 | |
| INVENTOR(S) | : Tsai et al. | |

It is certified that error appears in the above-identified patent and that said Letters Patent is hereby corrected as shown below:

In the specification

In Column 1, Line 7, delete "Nov. 11, 2008" and insert -- Nov. 11, 2008, now Pat. No. 8,477,697, --, therefor.

Signed and Sealed this
Twenty-second Day of March, 2016

Michelle K. Lee
*Director of the United States Patent and Trademark Office*